(12) United States Patent
Wade et al.

(10) Patent No.: US 7,609,269 B2
(45) Date of Patent: Oct. 27, 2009

(54) ASSIGNING COLOR VALUES TO PIXELS BASED ON OBJECT STRUCTURE

(75) Inventors: Geraldine Wade, Redmond, WA (US); Tanya Matskewich, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 11/418,431

(22) Filed: May 4, 2006

(65) Prior Publication Data

US 2007/0257930 A1    Nov. 8, 2007

(51) Int. Cl.
*G06T 11/00*    (2006.01)

(52) U.S. Cl. .................. 345/467; 345/586; 345/611; 345/613; 345/468; 382/200; 382/267; 382/301

(58) Field of Classification Search .............. 382/200, 382/267, 301
See application file for complete search history.

(56) References Cited

U.S. PATENT DOCUMENTS

| | | | |
|---|---|---|---|
| 4,718,024 A | 1/1988 | Guttag et al. | 364/518 |
| 4,901,064 A | 2/1990 | Deering | 340/729 |
| 5,847,808 A | 12/1998 | Goggins | 355/22 |
| 6,219,025 B1 | 4/2001 | Hill | |
| 6,236,754 B1 | 5/2001 | Harrington | 382/199 |
| 6,243,070 B1 | 6/2001 | Hill | |
| 6,339,426 B1 | 1/2002 | Lui et al. | 345/467 |
| 6,342,896 B1 | 1/2002 | Shetter et al. | 345/589 |
| 6,459,419 B1 | 10/2002 | Matsubayashi | |
| 6,556,311 B1 | 4/2003 | Benear et al. | 358/1.9 |
| 6,829,748 B1 | 12/2004 | Browne | |
| 6,850,338 B1 | 2/2005 | Aschenbrenner et al. | 358/1.15 |
| 6,867,787 B1 | 3/2005 | Shimizu | |
| 6,894,701 B2 | 5/2005 | Brown | |
| 6,897,879 B2 | 5/2005 | Lyapunov et al. | 345/613 |
| 6,936,505 B2 | 8/2005 | Keys et al. | 438/166 |
| 7,006,096 B2 | 2/2006 | Koyama | |
| 7,030,845 B2 | 4/2006 | Maa | |
| 7,042,458 B2 * | 5/2006 | Frisken et al. | 345/469 |
| 2004/0212620 A1 | 10/2004 | Dowling | |

(Continued)

FOREIGN PATENT DOCUMENTS

GB    2 187 368 A    9/1987

(Continued)

OTHER PUBLICATIONS

Hermes, L., et al., "Parametric distributional clustering for image segmentation," *Computer Vision—ECCV*, 2002, 3, 577-591; downloaded from the Internet Feb. 28, 2006, 15 pages.

(Continued)

*Primary Examiner*—Antonio A Caschera
(74) *Attorney, Agent, or Firm*—Workman Nydegger (57) ABSTRACT

Systems and methods are provided for assigning color values to pixels based on object structure. For example, when rendering a writing system symbol on an electronic display, a non-color characteristic of the symbol can be measured and the measurement can be used to select a color value for a pixel associated with the symbol. Legibility of open and closed line-based graphical objects can be increased by inferring spatial depth and distance through application of a color assignment model.

18 Claims, 10 Drawing Sheets
(10 of 10 Drawing Sheet(s) Filed in Color)

U.S. PATENT DOCUMENTS

| | | |
|---|---|---|
| 2005/0129308 A1 | 6/2005 | Comfort |
| 2005/0157932 A1 | 7/2005 | Yamasaki ............... 382/199 |
| 2005/0162426 A1 | 7/2005 | Okada |
| 2005/0162427 A1 | 7/2005 | Momozono |
| 2005/0248581 A1 | 11/2005 | Choe et al. ............... 345/581 |
| 2006/0017733 A1 | 1/2006 | Matskewich |
| 2007/0257929 A1 | 11/2007 | Wade |

FOREIGN PATENT DOCUMENTS

| | | |
|---|---|---|
| WO | WO2004/111947 A1 | 12/2004 |

OTHER PUBLICATIONS

Jacobson, N., et al., "Color as a determined communication," *IBM Systems Journal*, 1996, 35(3 & 4), 526-538.

Martin, D.R., et al., "Learning to detect natural image boundaries using local brightness, color and texture cues," *IEEE Trans. On Pattern Analysis and Machine Intelligence*, 2004, 26(5), 530-549.

Shoaff, W., "Color, illumination models, and shading," http://www2.cs.fit.edu/~wds/classes/graphics/Illuminate/illuminate/illuminate.html, downloaded from the Internet on Mar. 3, 2006, 1-33.

"Color Models," http://www.cs.brown.edu/courses/cs092/VA10/HTML/ColorModels.html, downloaded from the Internet on Mar. 3, 2006, 1-4.

"Color representation systems," *Chapter 2*, http://www-cal.univ.lill-lel.fr/~nv/cd/publis/publi97/spie97/html/spie97002.html, downloaded from the Internet on Mar. 3, 2006.

U.S. Appl. No. 10/145,317, filed May 13, 2002, Hitchcock.

U.S. Appl. No. 11/158,502, filed Jun. 22, 2005, Matskewich.

Sub-Pixel Font Rendering Technology "Implementation Details" Steve Gibson, Last Edit: Oct. 23, 2003, http://www.grc.com/cttech.htm\.

Office Action dated Jan. 23, 2009 cited in U.S. Appl. No. 11/418,329.

Office Action dated Jul. 9, 2008 cited in U.S. Appl. No. 11/418,329.

Office Action dated Jul. 8, 2009 cited in U.S. Appl. No. 11/418,329 (Copy Attached).

\* cited by examiner

Strokes: color of a stroke corresponds to the average value of the external normal

ASSIGNING COLOR VALUES TO PIXELS BASED ON OBJECT STRUCTURE

BACKGROUND

Today's rendering, whether on an electronic display such as a computer monitor coupled to a personal computer, or a television screen, or on paper display such as a paper printed using a printer coupled to a personal computer, uses "blind" or structure indifferent rules for the color choices and blends. For example, in FIG. 1, the color of the intersections of the red and blue objects does not depend on the structure of the objects. The "X" on the left of the figure is a purple color at the intersection, as are the intersections of the gridlines in the middle, as is the intersection of the circles on the right. The purple is a blend of the overlapping colors of the objects and does not depend on the fact that one object forms an "X", another forms a grid, and another forms two overlapping circles.

CLEARTYPE® technology developed by MICROSOFT® Corporation of Redmond, Wash. represents the present state of the art in on screen font rendering. CLEARTYPE® uses a technique called sub-pixel rendering, which is generally understood to improve luminance detail and therefore produce better resolution, but which can suffer from poor chrominance detail.

Without subpixel rendering, the software in a computer treats the computer's electronic display as an array of indivisible pixels, each of which has an intensity and color that are determined by the blending of three primary colors: red, green, and blue. However, actual electronic display hardware usually implements each pixel as a group of three adjacent, independent subpixels, each of which displays a different primary color.

If the computer controlling the display knows the exact position and color of all the subpixels on the screen, it can take advantage of this aspect of the electronic display hardware to improve the apparent sharpness of the images on the screen in certain situations. If each pixel on the display actually contains three subpixels of red, green, and blue in that fixed order, then things on the screen that are smaller than one full pixel in size can be rendered by lighting only one or two of the subpixels.

For example, if a diagonal line with a width smaller than a full pixel must be rendered, then this can be done by lighting only the subpixels with centers that belong to the line. If the line passes through the leftmost portion of the pixel, only the red subpixel is lit; if it passes through the rightmost portion of the pixel, only the blue subpixel is lit. This effectively triples the sharpness of the image at normal viewing distances; but the drawback is that the line thus drawn will show color fringes upon very close examination: at some points it might look green, at other points it might look red or blue. CLEARTYPE® and other subpixel rendering technologies do not choose a particular subpixel because the color of that subpixel is desired, but rather because of the location of the subpixel. If it so happened that the order of the subpixel colors were reversed, e.g. blue-green-red instead of red-green-blue, then subpixel rendering technology that formerly chose to illuminate only a red subpixel would now choose to render only the blue subpixel.

CLEARTYPE® uses the above method to improve the sharpness of text. When the elements of a writing system symbol are smaller than a full pixel, or when a particular line has a boundary in the middle of a pixel instead of at a pixel boundary, subpixel rendering technology lights only the appropriate subpixels of each full pixel in order to more closely follow the outlines of the symbol. Each subpixel is lighted or not lighted based on local conditions of how the symbol falls across that pixel. The overall structure of the symbol, for example the fact that it may contain an interior space, e.g. the letter "p" or "Q" (as opposed to "l" or "I", which do not contain interior space) or the fact that it may contain two strokes that are very close together, such as "m" and "n", is not taken into account.

While CLEARTYPE® and other subpixel rendering technologies provide improved rendering, there are certain rendering problems that remain. For example, even if graphical objects could be rendered with infinite resolution, they would still suffer from unwanted visual artifacts, such as image retention, color after-image, color vibration, flashing or pulsing phenomenon. These can be seen in structure inter-joins, intersecting lines, small interior counter-spaces, and corners. No matter what the resolution, for example even in the case of printers which can print on paper with much higher resolution than can be produced on a screen, these artifacts can still have a disturbing visual effect and interfere with optimal legibility and comfort of viewing. Moreover, current CLEARTYPE® and other sub-pixel rendering technologies are based on achieving better local luminance resolution. They do not strive for or achieve better overall object appearance based on the structural characteristics of objects.

In light of the foregoing, there is a need in the industry for a technology that goes beyond CLEARTYPE® and other subpixel rendering technologies to address the various visual artifacts and other legibility problems that occur.

SUMMARY

In consideration of the above-identified shortcomings of the art, the present invention provides systems and methods assigning chromaticity, luminance, and/or saturation values to pixels based on object structure. For example, when rendering a writing system symbol on an electronic display, a characteristic of the symbol can be measured and the measurement can be used to select a chromaticity, luminance, and/or saturation value for a pixel associated with the symbol. Legibility of open and closed line-based graphical objects can be increased by inferring spatial depth and distance through application of a chromaticity, luminance, and/or saturation perception model. Other advantages and features of the invention are described below.

BRIEF DESCRIPTION OF THE DRAWINGS

The file of this patent contains at least one drawing/photograph executed in color. Copies of this patent with color drawing(s)/photograph(s) will be provided by the Office upon request and payment of the necessary fee.

The systems and methods for assigning color values to pixels based on object structure in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

In one embodiment, the invention comprises assigning chromaticity, luminance, and/or saturation values to pixels based on object structure. The term "color" will be used herein to refer to chromaticity, luminance, and/or saturation to avoid verbosity of the text, but it should be kept in mind that "color" can be any of chromaticity, luminance, and/or saturation or any combination thereof.

When rendering a writing system symbol on an electronic display, a non-color characteristic of the symbol can be measured and the measurement can be used to select a color value for one or more pixels associated with the symbol. Legibility of open and closed line-based graphical objects can be increased by inferring spatial depth and distance through application of a color assignment model. By understanding the visual effect of the color of a portion of an object and individually controlling the color values, by for example assigning pixel colors, we can mitigate the most offensive visual effects and improve legibility even down to a small Pixels Per Em (PPEM) size.

It should be noted however, that while color can be used beneficially to improve legibility as described herein, implementations of the invention need not rely exclusively on the techniques set forth herein. In particular, the techniques described herein may be beneficially combined with sub-pixel rendering technologies described in the background section, resulting in some combination of the intentional color choice techniques provided herein and the color-as-byproduct effects of sub-pixel rendering. Such combinations remain largely unexplored and will doubtless improve as the techniques described herein become increasingly widespread.

In one embodiment, a method is provided for rendering objects on an electronic display. An object, as the term is defined here, refers to any image that can be displayed on a two-dimensional surface. The object may of course use perspective techniques to appear to be three-dimensional. Thus an object can be a graphic, such as a small or large image of a person, a plane, a circle, or any other item or shape, it could be line art, a bitmap, and/or scalable graphics.

An object can be a writing system symbol. The world has many writing systems and the invention may be applied to any of the associated symbols. Alphabets comprise symbols that represent sounds, for example a set of common symbols are the letters of an alphabet comprising uppercase and lowercase a, b, c, d, e, f, g, h, i, j, k, l, m, n, o, p, q, r, s, t, u, v, w, x, y, and z. There are also eastern writing symbols that represent entire words, and possibly even sentences or concepts.

An electronic display as the term is used here refers to any display that generates light to represent objects. Familiar displays are computer monitor displays, such as Light Emitting Diode (LED) displays, Cathode Ray Tube (CRT) displays, Liquid Crystal Displays (LCD), and so forth.

Figure 2:
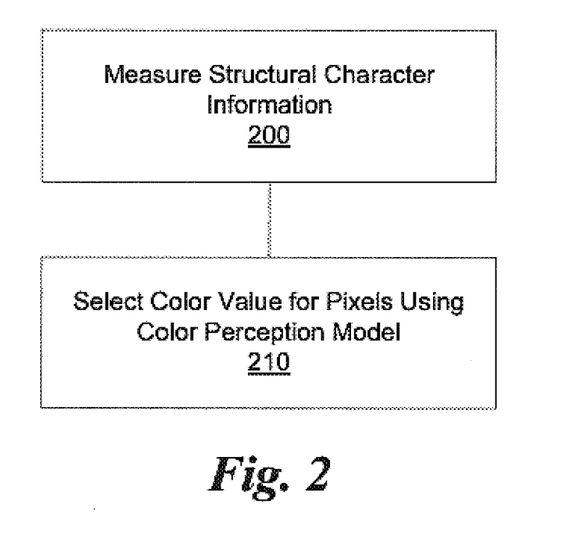
FIG. 2 is a flowchart indicating steps of a method for assigning color values to pixels based on object structure.

The method comprises steps as set forth in FIG. 2, for example measuring a non-color characteristic of an object, such as a symbol 200. A non-color characteristic is also referred to herein as structural character information. Structural character information comprises any non-color, non texture information describing object structure. As such it comprises information describing the physical layout of an object. Structural information may comprise information about distances between various portions of an object; negative space contained within the object; length, width, and height of portions of the object; angles of portions of an object with respect to other portions of the object; distances between portions of the object and another object; and so forth. Structural information excludes information about the color and texture of the object. Note, however, that while the term "structural information" excludes color and texture, embodiments of the invention can nonetheless use such values to compute colors of an object. If an object has an originally specified color- for example, if we want to render a red text on yellow background, this color will influence the resulting colors assigned to the pixels. The techniques related to the invention may compute modifications of an original color.

Figure 1:
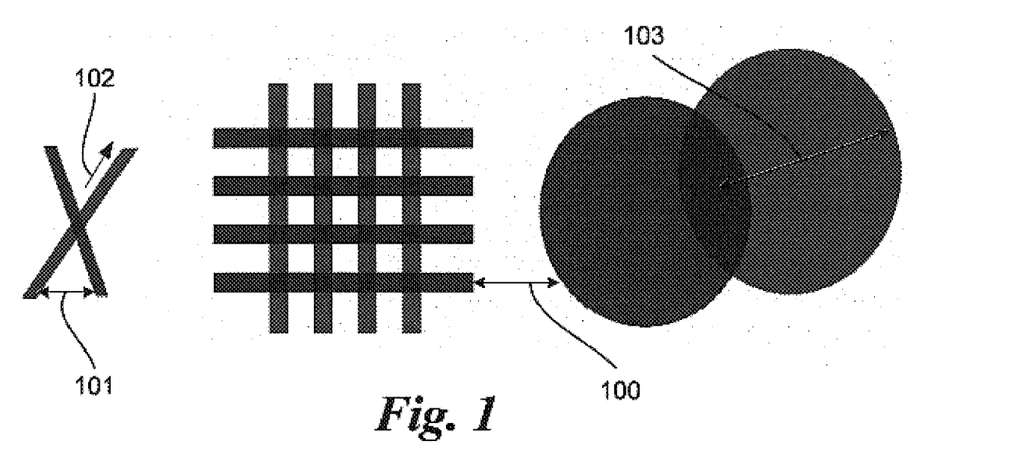
FIG. 1 illustrates three exemplary objects and various exemplary structural information that may be measured.

Referring to FIG. 1, a first example of a non-color characteristic of an object is a distance 100 from said object to another object, for example a distance 100 from a portion of the grid object in FIG. 1 to a portion of the circle object. Another example of a non-color characteristic comprises a distance 101 from a first portion of an object to a second portion of an object at a specified position, for example a distance 101 at some specified position between the red and blue legs of the X object in FIG. 1. Yet another example of a non-color characteristic comprises a boundary direction 102 of an object, for example the approximately northeasterly direction of the red stroke of the X object in FIG. 1. Another example of a non-color characteristic comprises distance 103 from a center of the object, for example the distance 103 of the outer edge of the red circle from the center of the blue and red circle object. Here, distance from center can be measured in a variety of ways, depending on how the center of the object is determined, and whether the physical center of an object is used or a visual center is used. A visual center is the location where the eye falls upon as the center of the object, regardless of where the "physical" center of the object is measured to be.

"Measuring" as that term is used herein comprises executing computer software that evaluates an object to obtain structural character information as well as otherwise receiving such information about an object. It is quite possible to have a set of data that represents pre-measured parameters of objects, and accepting such data to perform the invention is considered the same as measuring. By way of analogy, a person might use a ruler to measure the dimensions of a piece of furniture, or might look at the manufacturer's website to obtain the measurements from the furniture specifications. Both activities would be considered to be measuring as defined herein.

In one embodiment, structural information may be obtained from an input to a rendering engine, and additional structural information can be derived, comprising any desired local and global topology and geometry, and object characteristics such as distance, width, and orientation. Structural information can also be obtained from graphical applications, or graphical portions of applications such as MICROSOFT WORD®, for example. Additional information may be useful in "low resolution" scenarios as defined below, and such additional information may comprise, for example, a rendering size and relation to a pixel grid. In one embodiment, relation to the pixel grid can be derived from analyzing overscaled bitmaps which naturally leads to the device units and the pixel grid. For example, locations become "locations/positions with respect to the pixel grid", and distances are measured in fractions of pixels.

The result of measuring a non-color characteristic of object structure is to acquire a measurement. A measurement is a number or other useful representation of structural character information. The measurement may be a structured combination of information obtained in the measuring step. Such information may comprise numbers, e.g. measurements of distances, or other information such as Boolean identifiers (yes/no in response to certain identifiable queries). For example, the length of a hypotenuse might be derived from the length of two legs of a right triangle. The result would be considered a measurement even thought some additional calculation was performed to obtain it. Likewise any number of calculations might be performed to acquire useful structural character information. Because the invention is designed to be carried out using computing technologies, the measurement will likely be represented by a number in binary format.

The method next comprises selecting a color value for a pixel associated with the measured object 210. The color value that is selected is based on said measurement and a color assignment model. Most writing system symbols are rendered as black symbols on a white background. Inasmuch as they are displayed on an electronic display, pixels associated with the object may also be the pixels that are in the whitespace surrounding the symbol. This is because electronic displays generate black symbols by illumination of the surrounding pixels. The invention can be applied beyond mere black symbols, however, and so pixels associated with an object are any associated pixels. Thus, "pixels associated with an object" as that phrase is used herein, refers to any pixels whose values are calculated as a result of the object's rendering. A color value is formed, on most of today's hardware, by selecting the relative intensities of the various primaries that make up a pixel on a color display, and instructing display hardware to render the pixel according to the specified color value.

Color values will, in one embodiment, be selected for all pixels of an object. Improving legibility with relative color in general leverages ways the eye perceives, not just one color of one pixel, but the colors in relation to each other in and around the displayed object, and even the colors of proximal objects. Thus, in a preferred embodiment color values of all pixels associated with an object are selected based on the color assignment model. Note that the color assignment model may call for many of the pixels to be either white, corresponding to full brightness of the red, green, and blue elements, or black, corresponding to no brightness of any of the pixel elements. However, intelligent selection of pixel color as described herein does not preclude selection of a white, black or grey color value.

A color assignment model is defined herein as set of rules that correlate color values for pixels or portions of objects with structural character information. A number of exemplary rules that can be used in a color assignment model are provided herein. A color assignment model can be based on an underlying color perception model, which provides an underlying set of rules that allow prediction of how different color patterns are perceived by an average human observer. It should be emphasized that the invention is not limited to any particular assignment or color perception model, and it is likely that increasingly powerful color assignment and color perception models will be developed over time.

The color assignment model may have differing rules for "high resolution" and "low resolution" situations. We define a high resolution scenario herein to mean that the information conveyed by a particular graphical object is on a scale that is larger than a pixel. In other words, consider the letter A. In large rendering sizes, there is plenty of room to provide a viewer of an electronic display with sufficient information to identify the letter. The space contained in the enclosed triangle at the top of the A is, in large rendering sizes, many pixels wide, and no information is lost due to constraints of the hardware, i.e. the physical size of a pixel.

In small rendering sizes, however, the triangle at the top of the letter A may become so small that it is less than a pixel wide. This would be a low-resolution scenario as that term is used herein. It is more common to encounter low resolution scenarios in rendering eastern, glyph-based writing systems, because many of the glyphs contain minute detail which is impossible to fully convey in smaller rendering sizes due to hardware limitations. The resolution of the display is too low to convey all the information of the object. Thus, the terms high resolution and low resolution as used herein do not refer to the actual number of pixels on a display, but rather the relationship between the size of the information associated with an object and the smallest rendering units of a display. If a single object has both large strokes and fine detail, it may present both high and low resolution scenarios on a single display and within the single object, and such scenarios can be addressed using the high or low resolution perception models as described herein.

The term "rendering" as used herein refers to any stage in a rendering process, starting with design of software and/or objects to be rendered and ending with displaying the object. Thus "rendering" does not refer exclusively to operation of a rendering engine, as that term is understood in the art. The decision to alter coloration of an object under certain display conditions may in many cases be made prior to operation of a rendering engine.

For example, in a low resolution situation, the decision that a given object cannot be accurately displayed on an electronic display for the given rendering conditions, such as the rendering size, can be made at any stage in a rendering process. Such a decision may be made, for example, as a result of a general rule specified prior to final rendering stage or even at the design stage. In cases where such decisions are made at the design stage, a request to treat an electronic display as low-res becomes an input to the final rendering engine.

In one embodiment, a font designer or a software designer responsible for the rendering engine could notice that at a given rendering size most (or a large part) of the objects to be rendered will not be accurately displayed, and request a low-resolution model to be applied to all objects under the same rendering conditions. In this case, certain steps set forth herein, such as measuring a plurality of color characteristics, comparing the measurements to at least one display limitation of an electronic display; determining that a portion of a writing system symbol corresponding to at least one of the plurality of measurements that cannot be accurately displayed on the electronic display, and applying a color value to a pixel associated with the writing system symbol may take place before final rendering.

In this regard, operations carried out in connection with the systems and methods disclosed herein may be based on the parameters of a specific electronic display or an average electronic display, such as a display that a particular object is likely to be displayed upon. The term "electronic display" as used herein should be understood to comprise both of the above.

Figure 3:
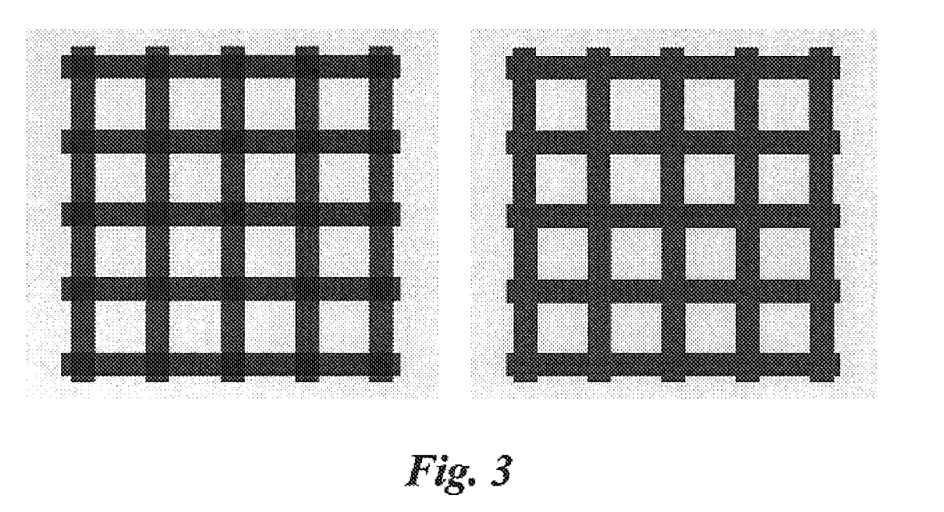
FIG. 3 illustrates the use of a color assignment model that uses at least one new color value to reduce visual interference.
Figure 4:
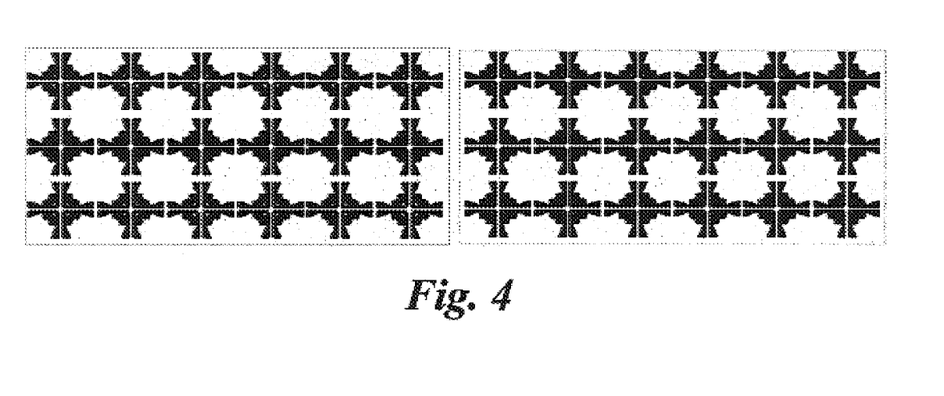
FIG. 4 illustrates the use of a color assignment model that uses at least one color value to reduce visual interference.

FIGS. 3 and 4 illustrate the use of a color assignment model that modifies at least one color value to reduce visual interference. The grid on the right side of FIG. 3 illustrates a grey grid on yellow background. The grid object on the right was rendered without intelligent color adjustment. There is a visual interference at the intersections from the strength of the surrounding yellow—this is a known phenomenon. In FIG. 4, the object on the right was also rendered with out intelligent adjustment and similarly results in interference phenomena.

A color assignment model has been applied to the pixels of the grid on the left side of FIG. 3 to mitigate the visual interference generated by the yellow on black intersections. This particular assignment model has applied a rule that acknowledges this type of interference and offers a solution that mitigates and minimizes unwanted optical interference of a given object by the application of color pixels adjacent or in near proximity to an interior space, for example by modifying colors in intersections between lines. The effectiveness of this perception model rule is dependent on a form of color balancing, with an appropriate percentage of color to form a distraction. Similarly, in FIG. 4, proximal color offsetting has been used to optically blend the interiors of the object on the left. The effectiveness of this technique depends on the hue, saturation, and luminosity of the offsetting color.

Figure 5A:
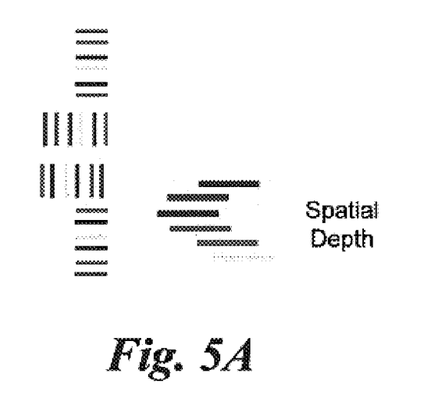
FIG. 5A illustrates the use of a color assignment model to demonstrate a perceived distance in spatial depth.

FIG. 5A illustrates the use of a color assignment model to demonstrate a perceived distance in spatial depth. Here we have taken computer generated colors R=255, G=255, B=255, and their mixed counterparts Magenta (R=255, B=255, G=0), Cyan (R=0, B=255, G=255), and Yellow (R=255, G=255, B=0) to showcase the use of color to represent a z depth hierarchy from the baseline of a perceived white background. The colors seem to either visually advance or recede. This relative spatial depth, intrinsic spatial hierarchy, or optical depth can be harnessed to increase legibility and/or add weight, contrast and space to an object. Appropriate colors can be used to visually separate portions of an object from one another; which in turn can make the object more visible or legible.

Figure 5B:
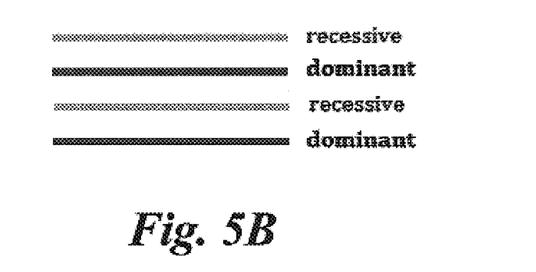
FIG. 5B illustrates exemplary colors that can be perceived as visually dominant or recessive.

In FIG. 5A it may be seen that the blue, red and magenta float above the green, yellow and cyan. Yellow is visually perceived in this instance to be the most recessive color, out of this selection. In this sense meaning that the yellow bar seems to recede into the background in comparison to the blue or red bar. In FIG. 5A we perceive an interesting phenomena with the full red and full blue bars. Intellectually we know that at a high level pure spectral colors have different spatial depths depending on the wavelength, or spectral power distributions. In the spectral realm red's wavelength is the strongest, therefore making red seem to stand out more against a shorter weaker blue wavelength. Therefore a color can be said to be visually dominant or recessive, such as perceived in FIG. 5B. However, note there are numerous variations from this, as exemplified in FIG. 5A and the invention is not limited to any particular set of perception rules, as noted above. A color assignment model can leverage spatial depth to open or close interior counter-spaces. The addition of white as a tint to colors, or black as a shade to color also helps in this perceived spatial depth. This is also helpful in keeping distances and relationships of distances. It can also denote a movement toward or away from an edge.

Figure 6:
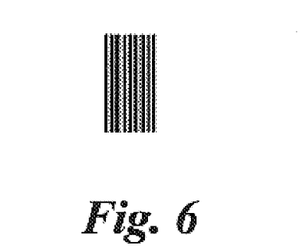
FIG. 6 illustrates the use of color to suggest additional strokes when there is no available physical space.

FIG. 6 illustrates the use of color to suggest additional strokes when there is no available physical space. The appropriate use of color suggests that there are more vertical lines in FIG. 6 than are actually rendered. Appropriate colors may also be used to position, accentuate, visually shift, optically open or close, highlight or depress structural elements such as counter-spaces depending on the desired outcome. These techniques are particularly applicable to low-resolution scenarios as defined above. For example, in the typographical applications, typical problems associated with low resolution are clashing strokes, interiors bleed form either the visual disturbances described above, or heavy indiscriminate filling in due to general anit-aliasing.

Figure 7:
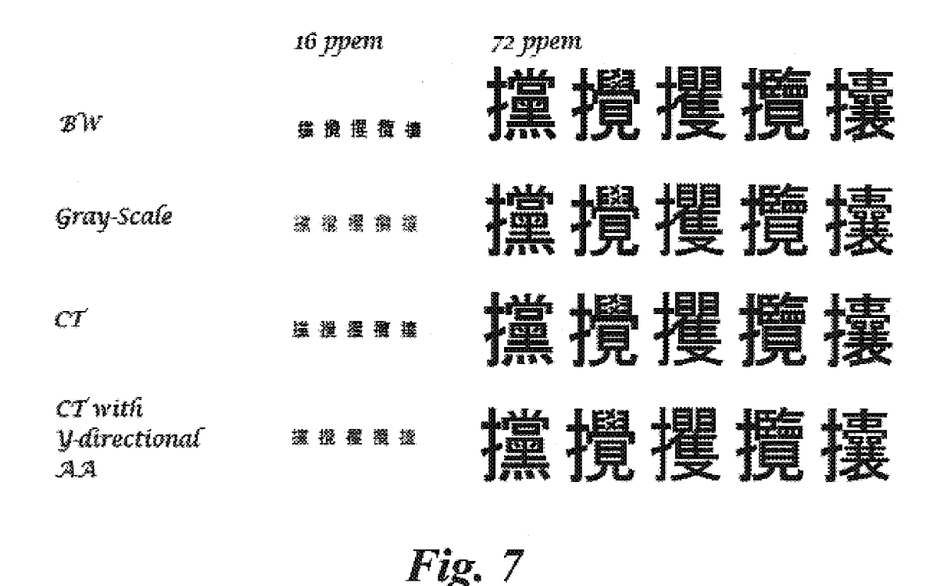
FIG. 7 illustrates writing system symbols rendered in 16 ppem and 72 ppem according to the rendering technique listed in the left hand column.

FIG. 7 illustrates writing system symbols rendered in 16 ppem and 72 ppem according to the rendering technique listed in the left hand column: Black and White (BW), Grey-Scale, CLEARTYPE®, and CLEARTYPE® with y-directional Anti-Aliasing (AA). While an improvement in legibility can be seen which progresses from the top row of symbols to the bottom row, even the "most improved" prior art version (CLEARTYPE® with Y-directional anti-aliasing) results in poor legibility.

Figure 8:
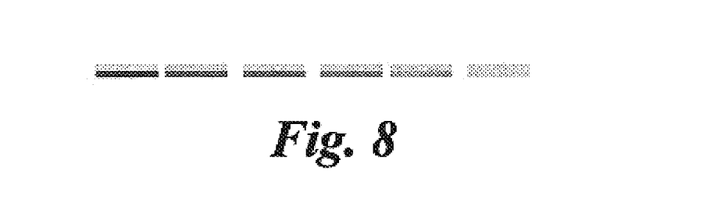
FIG. 8 illustrates the use of a color assignment model that uses at least one color value to suggest divergence of objects.
Figure 9:
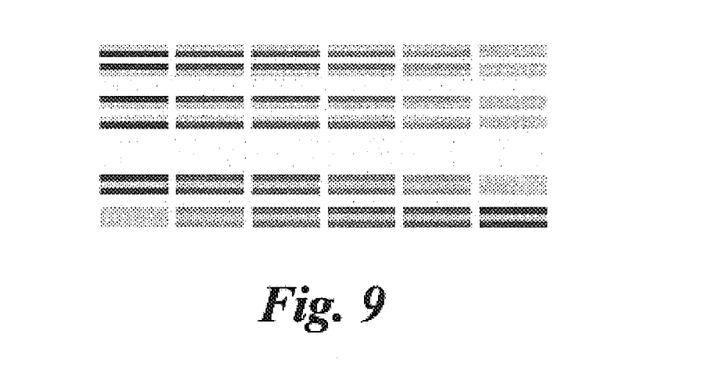
FIG. 9 illustrates the use of a color assignment model that uses at least one color value to suggest divergence of objects.

FIGS. 8 and 9 show the use of a color assignment model that uses at least one color value to suggest divergence of objects. There are 6 bars of colors ranging from left to right. Even though the colors are applied along the same plane, and they share the same baseline, the bars look as though they 'lift' off toward the end of the sequence. This is achieved by a balance of color application both to the base bar and the color chosen to sit directly above it. FIG. 9 shows the same set of bars and sequence but flipped in different directions. This is to exacerbate the phenomena seen in FIG. 8. Dark bars close together enclose, the light bars expand the space. However, the converse can be true in certain situations, on the second row you see the dark bars set apart can also expand the space—and the light can seem smaller, narrower in comparison. We are using this knowledge to open up interior counterspaces within objects, such as but not limited to line art and type.

The following are some example selecting color values for pixels associated with an object, such as writing system symbol, wherein the color value that is selected is based on a measurement of a non-color characteristic of the object. The choice of colors for the various structural aspects of the objects may be based on a color assignment model.

Figure 10:
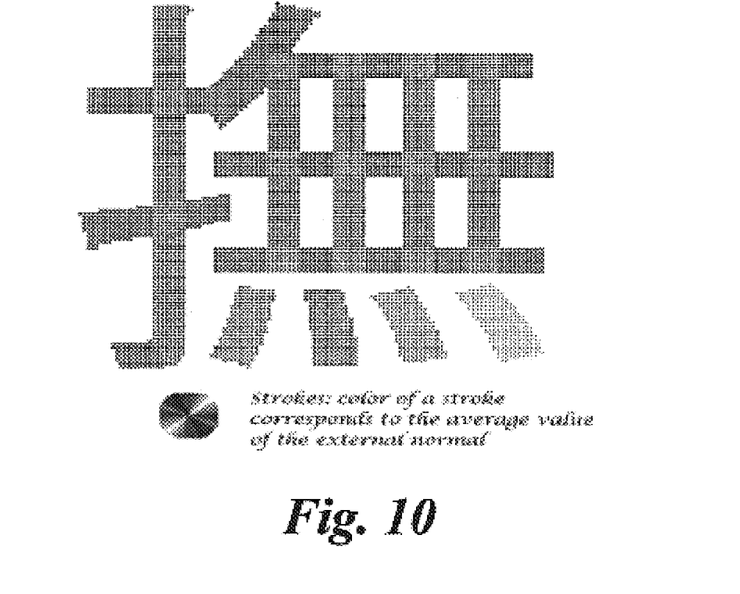
FIG. 10 illustrates a symbol with color values selected based on an average directionality of strokes, thereby providing a non-limiting exemplary characteristic of an object that can be utilized for determining color choices.

FIG. 10 shows a symbol with color values selected based on an average directionality of strokes, thereby providing a non-limiting exemplary characteristic of an object that can be utilized for determining color choices. The glyph is decomposed into a set of linear strokes. The colors used relate to the color wheel chart beneath the symbol.

Figure 11:
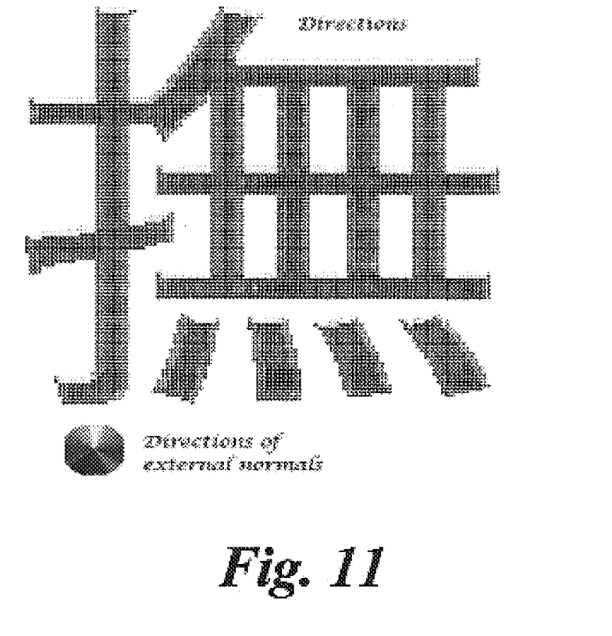
FIG. 11 illustrates a symbol with color values selected based on directions of the outer normals (perpendiculars) of strokes, thereby providing a non-limiting exemplary characteristic of an object that can be utilized for determining color choices.

FIG. 11 shows a symbol with color values selected based on directions of the outer normals (perpendiculars) of strokes, thereby providing a non-limiting exemplary characteristic of an object that can be utilized for determining color choices. FIG. 11 shows also that differing color assignment models can require differing extent and complexity of structural information to be measured. Color values may in some embodiments be selected based on incomplete structural information.

Figure 12:
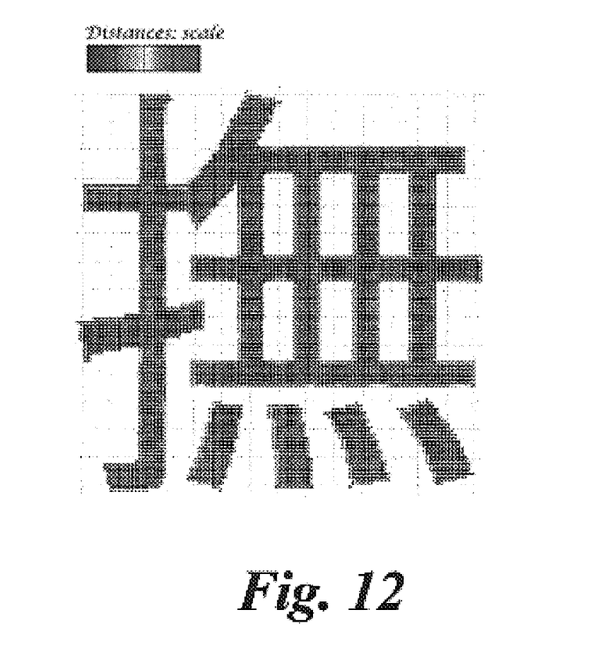
FIG. 12 illustrates a symbol with color values selected based on distances of strokes to a nearest other portion of the object, thereby providing a non-limiting exemplary characteristic of an object that can be utilized for determining color choices.

FIG. 12 shows a symbol with color values selected based on distances of strokes to a nearest other portion of the object, thereby providing a non-limiting exemplary characteristic of an object that can be utilized for determining color choices. Distances may also be measured to another object and/or an image boundary. Here, the distance is measured in the direction of the external normal to the stroke, and are measured locally for every point of the object's boundary. In some embodiments, the selection of color values based on structural information may be limited by time and complexity constraints, and/or the amount of structural information available. The more information we can gather from the object, the more options that are available in selecting color. A color assignment model may, in some cases, be selected based on the amount and types of structural character information that is available for a particular object or set of objects.

Figure 13:
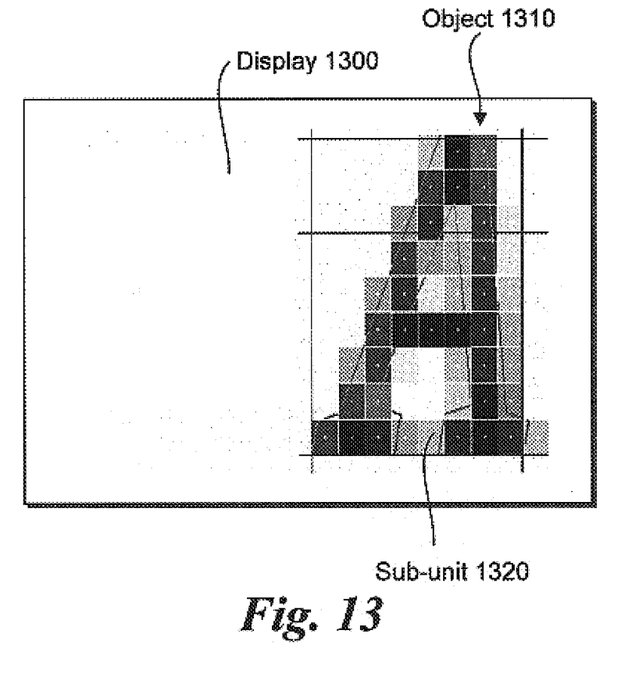
FIG. 13 illustrates an automatically generated display that embodies various aspects of the invention.

In another embodiment, as illustrated in FIG. 13, an automatically generated display 1300 is provided that embodies certain aspects of the invention. An automatically generated display 1300 can be any display that is generated electronically or mechanically, for example it may be a paper page that is printed by a printer coupled to a computer, or an electronic display that is coupled to a computer.

The automatically generated display 1300 comprises an object 1310 such as a writing system symbol, wherein the object 1310 comprises a collection of sub-units, e.g. 1320 with individually controllable color values. In the case of an electronic display, the sub-units would typically be pixels. In the case of a printed page, the sub-units would be, for example, the dots generated by a dot-matrix printer, or the discrete ink particles laid down by any of the various other available printer technologies.

At least one of said sub-units 1320 is displayed with a color value selected based on a non-color characteristic of said object 1310, and may be further based on a color assignment model. Similar to the case of choosing pixel color in the description provided above, a measurement of structural character information is correlated to a color value using the color assignment model. The color values of the entire object 1310 may be selected in view of the object's structure as a whole, surrounding objects, and the colors of the various sub-units in the object and surrounding objects.

Figure 14:
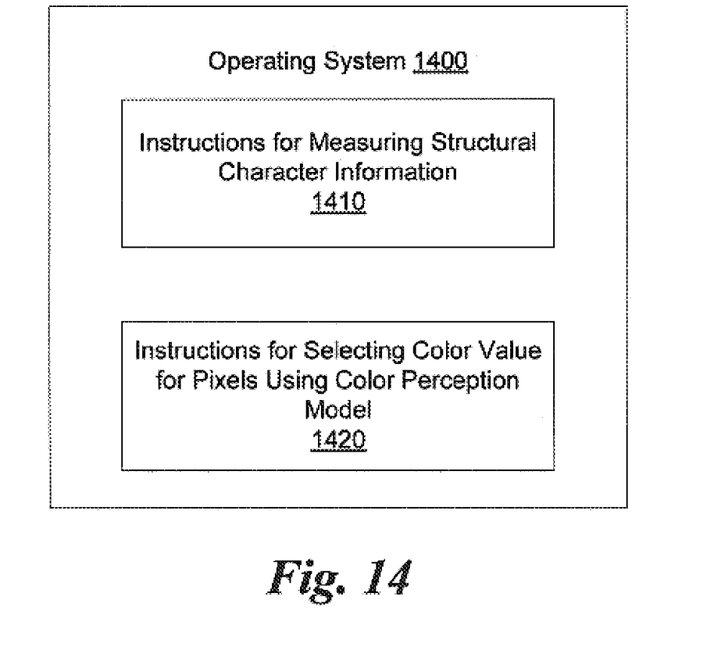
FIG. 14 illustrates computer application software, such as a computer operating system, comprising computer executable instructions for rendering objects, such as writing system symbols.

In yet another embodiment, as illustrated in FIG. 14, the invention provides computer application software, such as a computer operating system 1400 comprising computer executable instructions for rendering objects, such as writing system symbols. Computer operating systems are known to people of skill in the art, and generally provide a software infrastructure for application support and user experience. As such, applications may comprise rendering software to paint the various objects on an electronic display, or to instruct printers and the like to appropriately render objects.

The operating system 1400 comprises instructions for measuring a non-color characteristic of an object to be rendered 1410. Such instructions are implementable by those of skill in the art with the benefit of the disclosure provided here. The instructions 1410 acquire a measurement as that term is defined above.

The operating system 1400 further comprises instructions for selecting a color value for a pixel associated with said object, wherein the measurement and a color assignment model are used to choose the particular color value 1420.

Some general illustrative examples of potential embodiments of the invention are set forth below.

Figure 15:
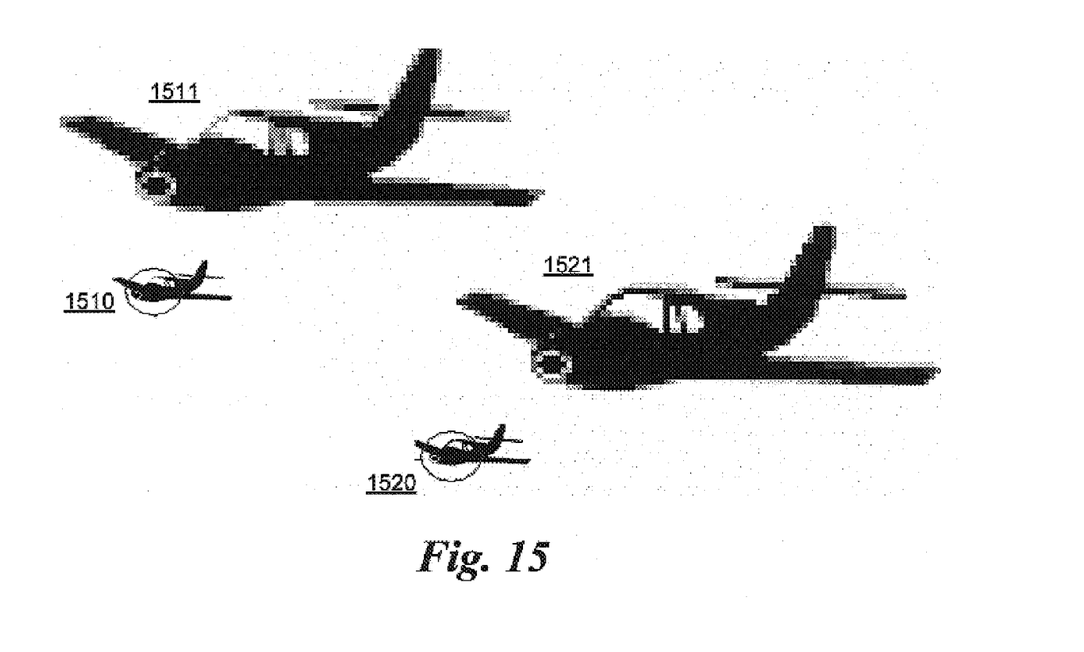
FIG. 15 provides two illustrations of a single engine airplane 1510, 1520. 1511 and 1521 provide magnified views of 1510 and 1520, respectively.

FIG. 15 provides two illustrations of a single engine airplane 1510, 1520. 1511 and 1521 provide a magnified view of 1510 and 1520, respectively. 1510 was rendered using preexisting techniques, while 1520 was rendered using the techniques of the invention. The nose of the plane 1510 lost its definition because of blind 'pixel bleed'. With knowledge of the structural information, and in particular that which is interior negative space, 1520 shows improvement in definition.

Figure 16:
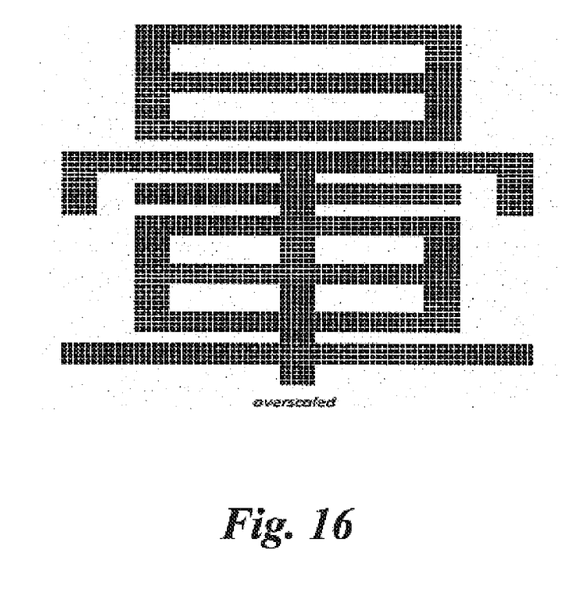
FIG. 16 illustrates an overscaled bitmap of a complex glyph.
Figure 17:
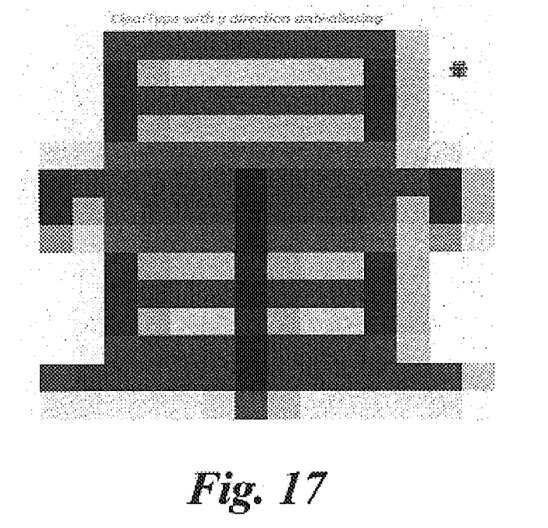
FIG. 17 illustrates the glyph of FIG. 16 rendered with existing CLEARTYPE® technology using y-direction anti-aliasing.
Figure 18:
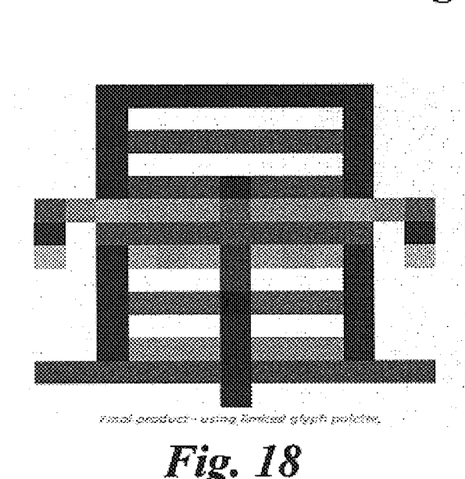
FIG. 18 illustrates an example of the same glyph from FIG. 16 rendered according to an embodiment of the invention.
Figure 19:
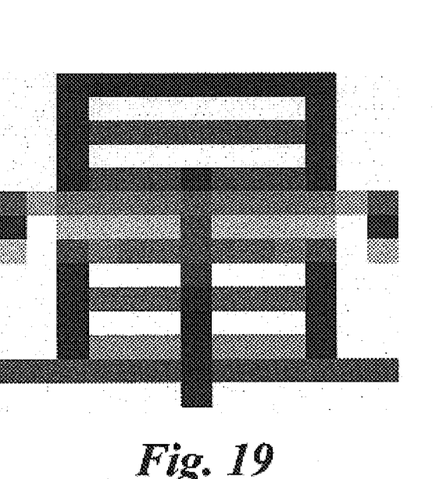
FIG. 19 illustrates an example of the same glyph from FIG. 16 rendered according to an embodiment of the invention.
Figure 20:
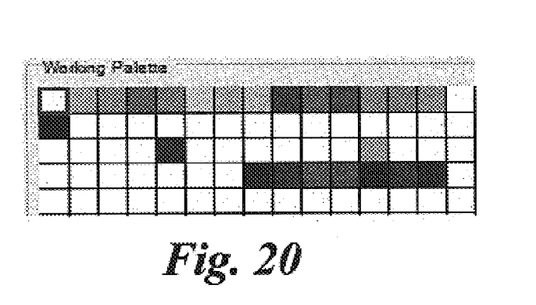
FIG. 20 illustrates the working palette for the glyphs depicted in FIGS. 18 and 19.
Figure 21:
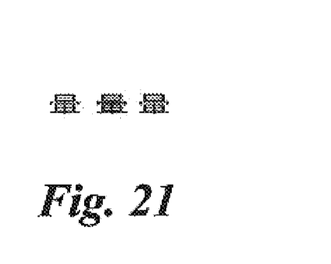
FIG. 21 illustrates a side by side comparison of the glyph in low resolution rendered as a bitmap (left), using CLEARTYPE® (middle), and using an embodiment of the invention (right).

FIG. 16 provides an overscaled bitmap of a complex glyph. FIG. 17 demonstrates what the glyph looks like with current CLEARTYPE® rendering with y-direction antialiasing. FIGS. 18 and 19 provide examples of the same glyph rendered using an embodiment of the invention. FIG. 20 illustrates the working palette for the glyphs depicted in FIGS. 18 and 19. Base color palettes can be built from across the color space to improve rendering of glyphs. These are not related to CLEARTYPE® algorithms or filter parameters. Our method shows control of use of color in all directions or orientation. Certain areas may need color half bitting for optimal rendering result. The knowledge we gather from structural information allows eliminating trivial dependencies between color assignment in X and Y directions and leads to X-Y independent or X-Y inter-connected algorithms that may furthermore be adaptive depending on local and global location, weight and directionality. FIG. 21 provides a side by side comparison of the glyph in low resolution rendered as a bitmap (left), using CLEARTYPE® (middle), and using an embodiment of the invention (right).

Figure 22:
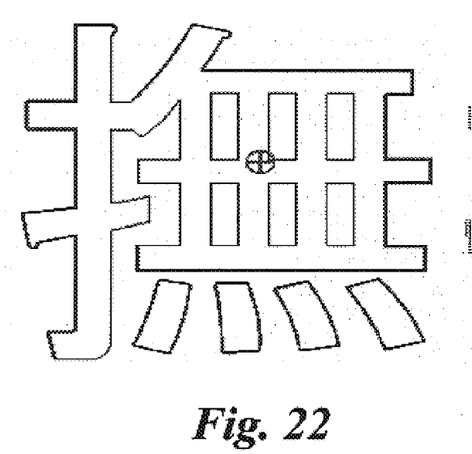
FIG. 22 illustrates using location, width and directionality of portions of an object to define the resulting colors.

FIG. 22 demonstrates using location, width and directionality of portions of an object to define the resulting colors. The red crosshairs are at the visual or optical center of the object. There are four main horizontal bars, and one horizontal terminal. There are five main vertical bars, two diagonals, and four curvilinear strokes. In an exemplary perception model used in this example, it is important to establish a visual center. The visual center is the main area the eye is drawn to. By keeping this area open legibility can be enhanced. This is accomplished by repelling portions of the object from the center through keeping distance between strokes and lines, and/or attracting portions of the object to each other by extracting out color, saturation and hue.

Although we use a specific color palette in FIGS. 18 and 19, as provided in FIG. 20, a color can potentially be taken from anywhere from color space. There may also be different approaches to the choice of the color values used in x than y directions because of visual sensitivities to color that are more obvious in the y direction. Intersections can be treated as either open or closed depending on where they are in relation to their neighboring pixels. We achieve contrast and balance by using color pixels to enhance legibility of open and closed graphical line objects.

Figure 23:
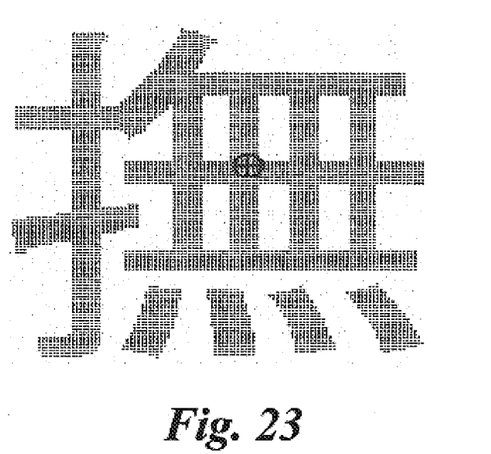
FIG. 23 illustrates the glyph of FIG. 22 represented as an 8×8 overscaled bitmap.
Figure 24:
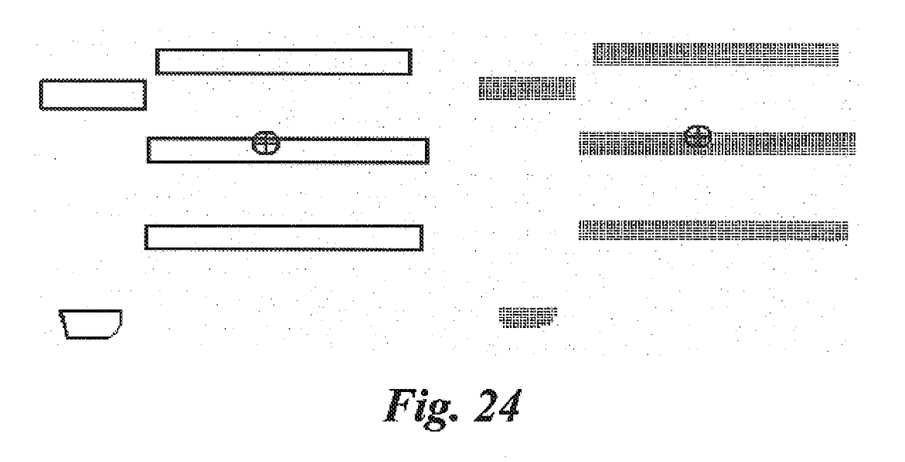
FIG. 24 illustrates a representation of the horizontal bars only of FIG. 22 in both outline (left) and overscaled (right).
Figure 25:
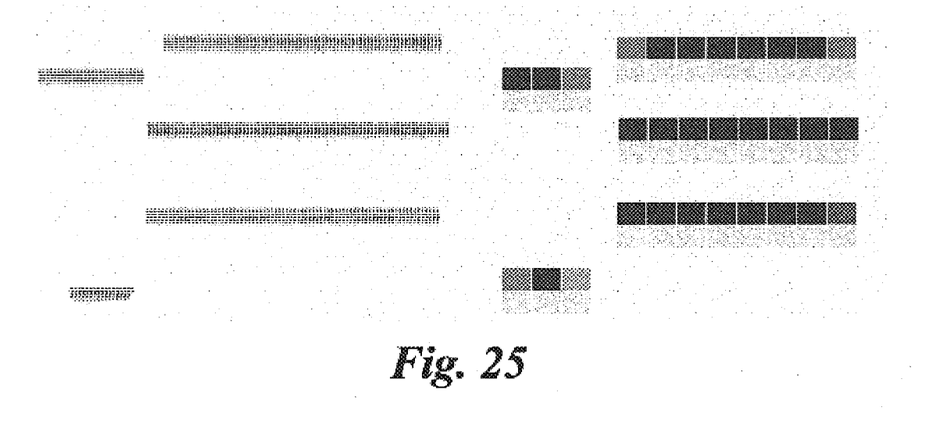
FIG. 25 illustrates how we can color individual subpixels to affect the lower level rendering of the glyph.
Figure 26:
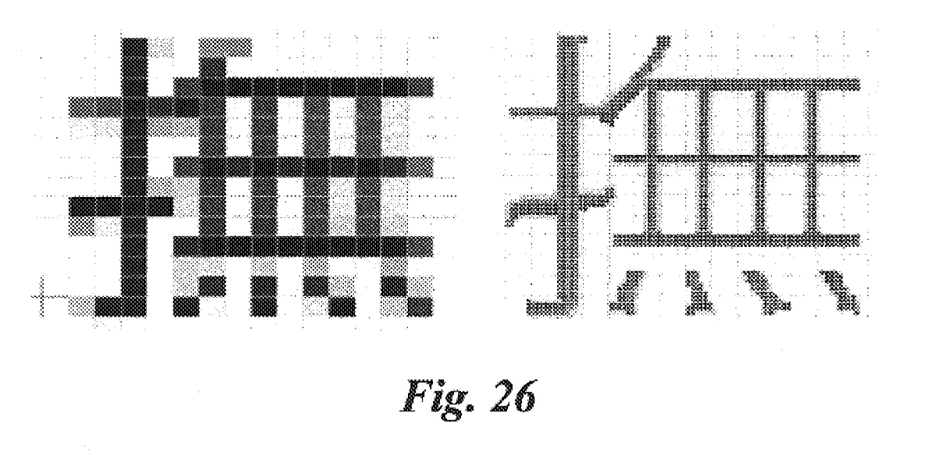
FIG. 26 illustrates possible renderings of a glyph using the techniques of the invention: on the left is a resulting "full-pixel" image, on the right is an overscaled image with assigning of the colors roughly following the strokes' middle lines.
Figure 27:
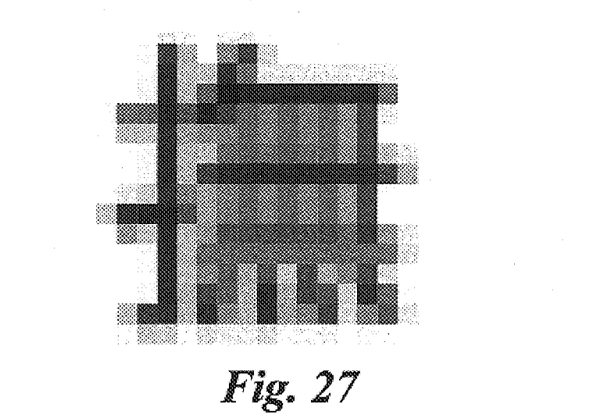
FIG. 27 illustrates a CLEARTYPE® rendering of the glyph from FIG. 26.

FIG. 23 illustrates the glyph of FIG. 22 represented as an 8×8 overscaled bitmap. FIG. 24 is a representation of the horizontal bars only of FIG. 22 in both outline (left) and overscaled (right). FIG. 25 shows how we can color individual subpixels to affect the rendering of the glyph. We can also manipulate the weighting of the color intensities to affect contrast. We can also affect rules of weight assignment in overscaled bitmaps, relating colors to different layers and different directionality. By changing the weight or color of an overscaled bitmap we can show significant improvement over current CLEARTYPE® rendering of complex glyphs. FIG. 26, illustrates possible renderings of a glyph using the techniques of the invention: on the left is a resulting "full-pixel" image, on the right is an overscaled image with assigning of the colors roughly following the strokes' middle lines. According to a possible embodiment of the invention the color values are assigned to the subpixels of an over-scaled bitmap and then are subject to some averaging filtering in order to derive the resulting color values of the pixels. In contrast, FIG. 27 illustrates a CLEARTYPE® rendering of the glyph from FIG. 26.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A method for rendering a writing system symbol on an electronic display comprising a plurality of pixels that is coupled to a computer system, the method comprising:
    measuring a plurality of non-color characteristics of said writing system symbol to acquire a plurality of measurements;
    comparing the measurements to at least one display limitation of said electronic display;
    determining that a portion of said writing system symbol corresponding to at least one of said plurality of measurements cannot be accurately displayed on said electronic display;
    applying a color value to a pixel of the electronic display associated with said writing system symbol, the color value setting the color of the pixel on the electronic display so as to suggest said portion of said writing system symbol that cannot be accurately displayed on said electronic display by suggesting divergence between a portion of the writing system symbol and another object displayed on the electronic display in accordance with a color perception model.

2. The method of claim 1, wherein the symbol is a character of an alphabet.

3. The method of claim 2, wherein said character of an alphabet is a letter selected from the group comprising uppercase and lowercase a, b, c, d, e, f, g, h, i, j, k, l, m, n, o, p, q, r, s, t, u, v, w, x, y, and z.

4. The method of claim 1, wherein the symbol is a glyph.

5. The method of claim 1, wherein said at least one of said plurality of measurements comprises a distance from said writing system symbol to another writing system symbol.

6. The method of claim 1, wherein said at least one of said plurality of measurements comprises a distance from a first portion of said writing system symbol to a second portion of said writing system.

7. The method of claim 1, wherein said at least one of said plurality of measurements comprises a boundary direction of said at least a portion of said writing system symbol.

8. A method for rendering a writing system symbol on an electronic display comprising a plurality of pixels, the method comprising:
    measuring a plurality of non-color characteristics of said writing system symbol to acquire a plurality of measurements;
    comparing the measurements to at least one display limitation of said electronic display;
    determining that an interior space corresponding to at least one of said plurality of measurements cannot be accurately displayed on said electronic display;
    applying a color value to a pixel of the electronic display to set the color of the pixel on the electronic display, the pixel associated with said interior space to visually enlarge said interior space;
    wherein at least one of said plurality of measurements is a length of a straight line across said interior space.

9. The method of claim 8, wherein the symbol is a character of an alphabet.

10. The method of claim 9, wherein said character of an alphabet is a letter selected from the group comprising uppercase and lowercase a, b, c, d, e, f g, h, i, j, k, l, m, n, o, p, q, r, s, t, u, v, w, x, y, and z.

11. The method of claim 8, wherein the symbol is a glyph.

12. The method of claim 8, wherein said pixel associated with said interior space is a pixel immediately adjacent to said interior space.

13. An automatically generated display comprising an electronic display that is coupled to a computer, comprising:
    a collection of sub-units with individually controllable color values;
    a writing system symbol rendered on said automatically generated display, said writing system symbol comprising a plurality of portions, wherein at least one portion of said writing system symbol comprises information that is smaller than a sub-unit and therefore cannot be accurately rendered on said automatically generated display; and at least one sub-unit associated with said writing system symbol having a color value that suggests said information that is smaller than a sub-unit by said color using at least one color value to suggest divergence of objects.

14. The automatically generated display of claim 13, wherein the writing system symbol is a character of an alphabet.

15. The automatically generated display of claim 14, wherein said character is a letter selected from the group comprising uppercase and lowercase a, b, c, d, e, f, g, h, i, j, k, l, m, n, o, p, q, r, s, t, u, v, w, x, y, and z.

16. The automatically generated display of claim 13, wherein the symbol is a glyph.

17. The automatically generated display of claim 13, wherein said information that is smaller than a sub-unit comprises a distance from a first portion of said writing system symbol to a second portion of said writing system symbol.

18. The automatically generated display of claim 17, wherein said information that is smaller than a sub-unit comprises a measurement of the length of a straight line across a portion of the interior space of the writing symbol from said first portion of said writing system symbol to said second portion of said writing system symbol.

* * * * *